United States Patent
Graffin

Patent Number: 6,073,667
Date of Patent: Jun. 13, 2000

[54] WEIGHT-FILLING METHOD, AND A CORRESPONDING DEVICE

[75] Inventor: André Graffin, La Ferte Bernard, France

[73] Assignee: Serac Group, LaFerte Bernard, France

[21] Appl. No.: 09/172,013

[22] Filed: Oct. 14, 1998

[30] Foreign Application Priority Data

Oct. 24, 1997 [FR] France .................................. 97 13353

[51] Int. Cl.⁷ ........................................................ B65B 1/04
[52] U.S. Cl. ............................................. 141/372; 141/83
[58] Field of Search .............................. 141/372, 83, 369, 141/370

[56] References Cited

U.S. PATENT DOCUMENTS

| | | | |
|---|---|---|---|
| 4,721,138 | 1/1988 | Simonazzi | 141/372 |
| 5,301,725 | 4/1994 | Meinzinger | 141/372 |
| 5,456,297 | 10/1995 | Crossdale et al. | 141/83 |

FOREIGN PATENT DOCUMENTS

| | | |
|---|---|---|
| 0087310 | 8/1983 | European Pat. Off. . |
| 0314889 | 5/1989 | European Pat. Off. . |
| 4325836 | 2/1995 | Germany . |
| 9710856 | 3/1997 | WIPO . |

OTHER PUBLICATIONS

Meier R: "Fortschritte in Der Behaelterverwiegung" Chemietechnik vol. 23, No. 6, 1 juin 1994, p. 96/97 XP000458835.

*Primary Examiner*—David J. Walczak
*Attorney, Agent, or Firm*—Birch, Stewart, Kolasch & Birch, LLP

[57] ABSTRACT

A method of weight-filling a receptacle having a cylindrical neck and a collar extending around the neck, comprising the steps of suspending the receptacle by the collar and filling and weighing the receptacle while it is suspended, and a weight-filler device for filling, by means of a filler spout, a receptacle having a cylindrical neck and a collar extending around the neck. The device has a weighing device including a holding element having a top surface forming a support for the collar of the receptacle so that the receptacle extends vertically beneath the filler spout and is cantilevered out from a support member mounted on a structure to extend laterally therefrom and associated with a weighing sensor comprising an elastically flexible bar having one end rigidly secured to the structure and an opposite end connected to the support member so that the support member extends substantially horizontally irrespective of a presence of an absence of a container on the support member.

5 Claims, 2 Drawing Sheets

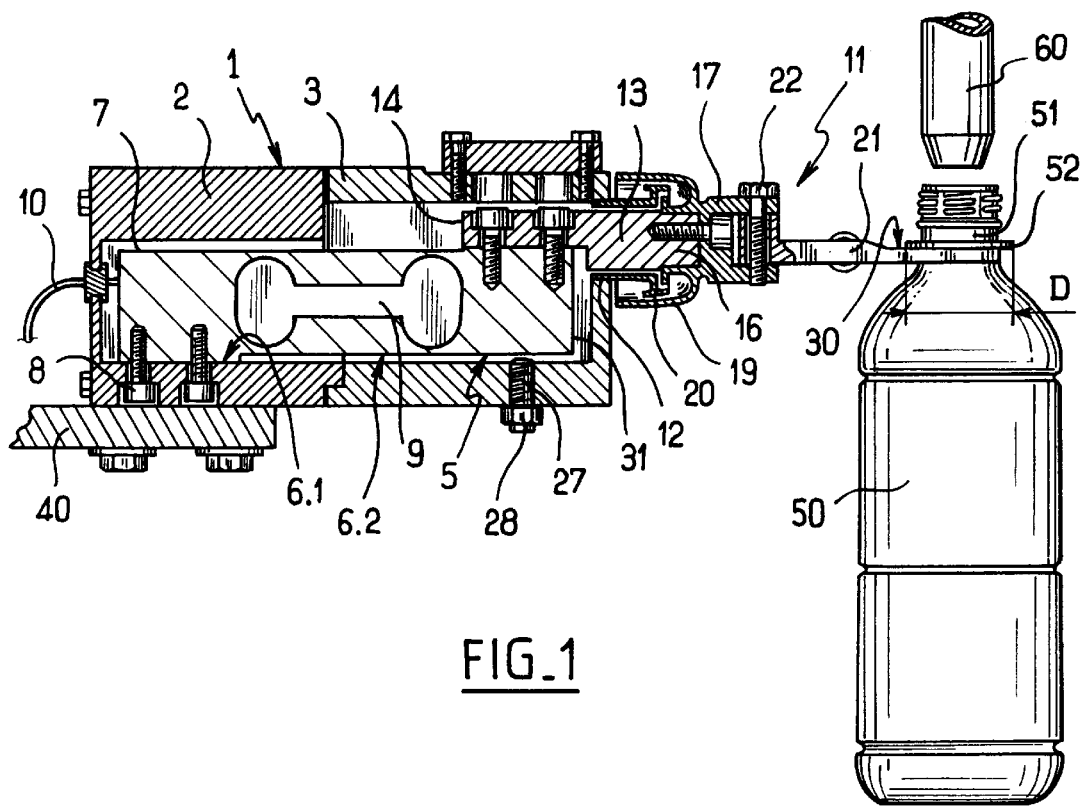
FIG_1
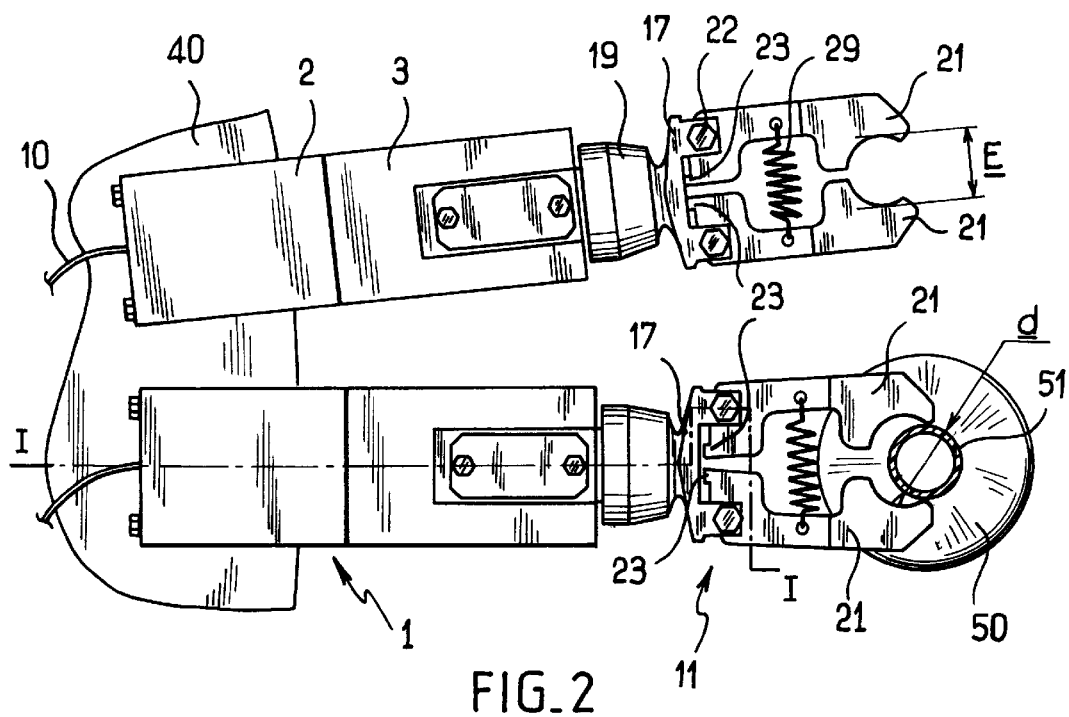
FIG_2

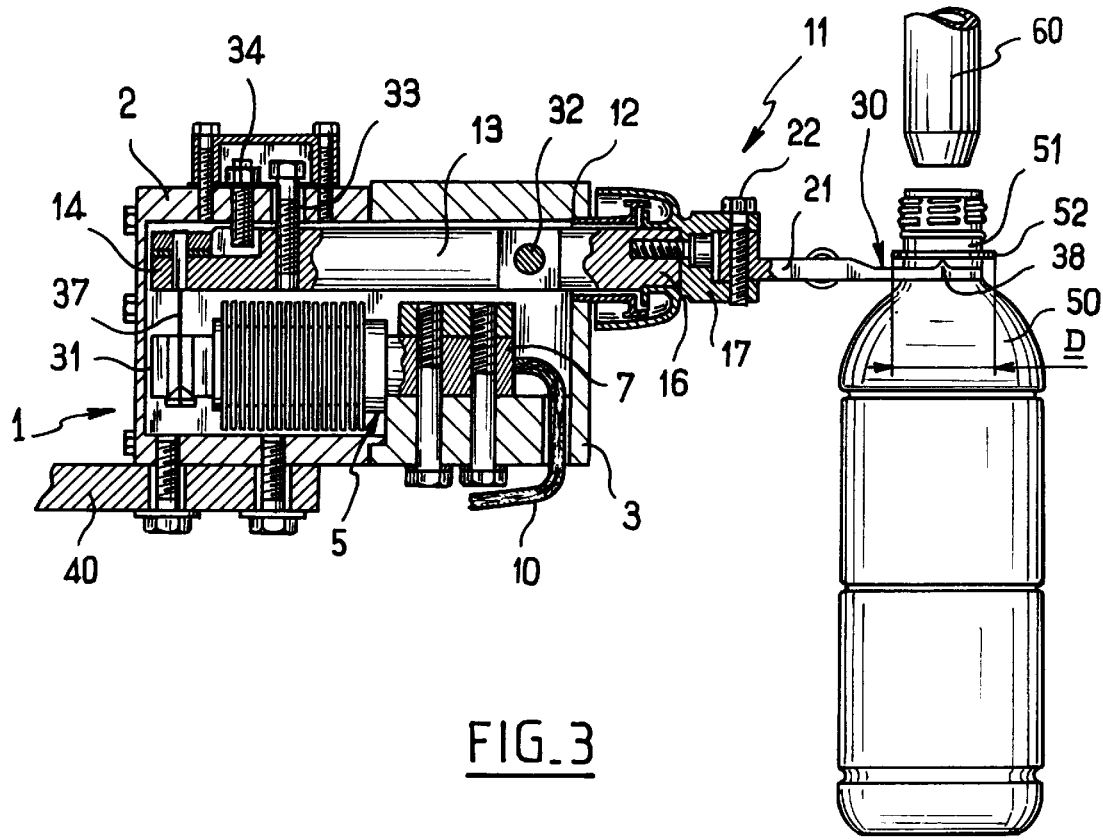
FIG_3
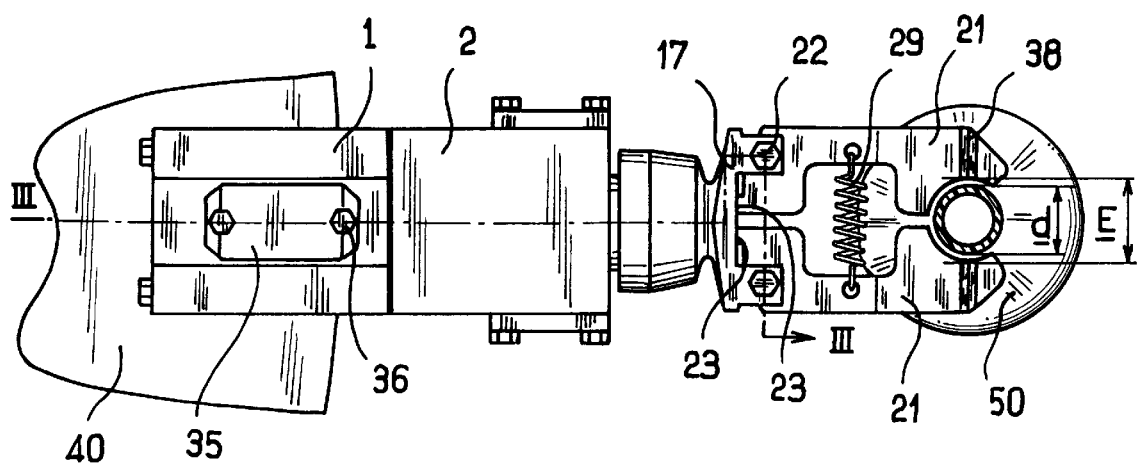
FIG_4

WEIGHT-FILLING METHOD, AND A CORRESPONDING DEVICE

The present invention relates to a method of weight-filling a receptacle having a neck and a collar extending around the neck, e.g. a receptacle such as a bottle, and the invention also relates to a corresponding weight-filling device.

BACKGROUND OF THE INVENTION

Known installations for weight-filling a receptacle having a neck generally comprise a weighing device which includes a weight sensor surmounted by a tray for supporting a receptacle. The weighing device is disposed so that its tray supports the bottom of the receptacle while the neck of the receptacle is positioned immediately beneath a filler spout. When the installation is designed to fill series of receptacles of different heights, then the position of the tray of the weighing device needs to be adjusted every time the series is changed so as to be adapted to the height of the receptacles in the new series. The installation then requires means for adjusting the position of the weighing device, thereby making the installation expensive, or else the weighing devices are adjusted manually, thereby requiring production to be interrupted and thus reducing productivity.

OBJECTS AND SUMMARY OF THE INVENTION

The invention provides a method of weight-filling a receptacle having a neck and a collar extending around the neck, the method comprising the steps of suspending the receptacle by its collar and of filling and weighing the receptacle while it is suspended.

The dimensions of the neck and of the collar are generally common to a plurality of receptacle formats so the method of the invention makes it possible to fill receptacles of different dimensions without any need to modify the installation.

The invention also provides a weight-filler device for weight-filling receptacles of the above-specified type, the device comprising at least one weighing device having a holding element with a top surface that forms a support for the collar of a receptacle so that the receptacle extends vertically beneath a filler spout and is cantilevered out from a support member associated with a weight sensor and mounted on a structure to extend laterally from the structure.

The holding element then makes it possible to suspend the receptacle via the collar on its neck in a position that is cantilevered out from the support member associated with the weight sensor. The weighing device is thus adapted to holding and weighing receptacles of different formats. In addition, the weighing device can be disposed laterally relative to the receptacle so that the weighing device is little exposed to any of the substance being filled flowing outside the receptacle, as can happen in the event of a malfunction, particularly if the receptacle is punctured or if the filler spout fails to switch off.

In a particular embodiment, the holding element comprises a clamp having jaws carrying abutments disposed so that in the abutment position the jaws define an opening of transverse dimension greater than the diameter of the neck and smaller than the diameter of the collar, in which case the jaws preferably have their top faces provided with respective projecting portions.

This causes the collar to have point support on the top surfaces of the jaws of the clamp. When the weighing device is mounted on a rotary platform, this disposition makes it possible to avoid variations in the point of application of the weight of the receptacle when the receptacle swings due to the effect of centrifugal force, and as a result weight measurements can continue to be accurate even when the weight sensor is not a constant moment sensor.

BRIEF DESCRIPTION OF THE DRAWINGS

Other characteristics and advantages of the invention appear on reading the following description of particular, non-limiting embodiments of the invention given with reference to the accompanying drawings, in which:

FIG. 1 is an elevation view, partially in section on line I—I of FIG. 2, showing the weighing device of a first embodiment of the invention;

FIG. 2 is a plan view of the weighing device of the first embodiment;

FIG. 3 is a view analogous to FIG. 1, in section on line III—III of FIG. 4, showing the weighing device of a second embodiment of the invention; and FIG. 4 is a view analogous to FIG. 2 showing the weighing device of the second embodiment.

MORE DETAILED DESCRIPTION

With reference to FIGS. 1 and 3, the weight-filling device described below is designed to fill receptacles 50 of the kind having a neck 51 and a collar 52 projecting outwards around the neck 51.

The filler installation is of the carousel type and comprises a rotary platform 40 of known type carrying a conventional filler circuit fitted with filler spouts 60 and with weighing devices, given overall reference 1, for holding the receptacles 50 vertically beneath the filler spouts 60 and for weighing the receptacles 50 while they are being filled.

With reference to FIGS. 1 and 2, the receptacle weighing device in the first embodiment comprises a structure given overall reference 1 constituted by an edge of the platform 40 to which there is fixed a box comprising two hollow portions 2 and 3 that are connected to each other.

A bar 5 of elastically deformable material is fixed to the structure 1, via a portion 6.1 of the bottom surface of the bar that is adjacent to an end 7 of the bar 5, while the remainder 6.2 of the bottom surface is projecting.

In known manner, the bar 5 has a strain gauge (not shown) designed to be connected to a filling control unit via an electrical conductor 10, and also an elongate through slot 9 to form a weight sensor of constant moment.

A support member given overall reference 11 extends laterally relative to the structure 1 through an opening 12 formed in box portion 3. The support member 11 has an arm 13 with an end 14 fixed on the top face of the bar 5 by screws and an opposite end 16 carrying a fork 17.

Two jaws 21 are pivotally mounted on the fork 17 via pivot-forming screws 22 so as to form a clamp.

The jaws 21 are connected to each other by a spring 29 urging the jaws into a close-together position where abutments 23 on the jaws 21 press against the fork 17. In this position, the opening defined by the jaws 21 is of a transverse dimension E greater than the diameter d of the neck 51 of a receptacle and smaller than the diameter D of the collar 52.

A tube 20 fixed to the box and a sleeve 19 secured to the fork 17 form a baffle preventing any filling substance from penetrating into the box.

A screw 27 fitted with a lock nut 28 is fixed in the bottom wall of box portion 3 perpendicularly to the bottom surface of the bar 5 and facing the bottom face of the end 31 of the deformable bar 5.

In operation, a receptacle is brought to the clamp by a loader. The side surface of the neck 51 comes into contact with the ends of the jaws 21 and moves the jaws apart against the force exerted by the spring 29. Once the jaws 21 have closed onto the neck 51, the top surfaces 30 of the jaws 21 form a support surface for the collar 52 of the receptacle. The receptacle 50 is then suspended from the clamp via its collar 52 with the clamp then constituting an element for holding the receptacle cantilevered out from the support member 11. The neck 51 of the receptacle 50 when suspended in this way extends immediately beneath the filler spout 60.

The weight of the receptacle 50 suspended from the clamp acts on the end 31 of the bar 5 via the support member 11. This force deforms the bar 5 and the deformation is detected by the strain gauge.

It will be observed that the assembly clearances which exist between the opening 12 and the arm 13, between the arm 13 and the tube 20, and between the tube 20 and the sleeve 19 suffice to allow the bar 5 to deform.

The maximum amplitude of deformation of the bar 5 can be modified by adjusting the screw 27 so as to constitute an abutment for the portion 6.2 of the bottom surface of the bar 5.

Elements that are identical or analogous to those described above are given the same numerical references in the following description of the second embodiment.

With reference to FIGS. 3 and 4, in the second embodiment, the box-forming portion 3 of the structure 1 has a bottom inside surface that is raised relative to the bottom inside surface of the portion 2. The elastic bar 5 is mounted the opposite way round to the previous embodiment, i.e. the end 7 of the bar 5 is fixed to the bottom inside surface of the portion 3 by screws.

The free end 31 of the bar 5 is connected via a link 37 to the end 14 of an arm 13 that is mounted to pivot in the portion 3 about a pivot axis 32. The end portion 16 of the arm 13 carries a fork 17 and jaws 21 pivotally mounted on the fork 17 in a manner analogous to that of the first embodiment.

The top faces of the jaws 21 are provided with projecting portions 38 constituted by ridges extending along a diameter of the opening defined by the jaws 21 perpendicularly to the longitudinal direction of the arm 13.

A headed screw 33 extends vertically through a hole made in the top wall of the portion 2 and is fixed in the arm 13 at its end opposite from the jaws 21 about the pivot axis 32. The head of the screw 33 thus constitutes an abutment for counterclockwise movement of the arm 13. A screw 34 provided with a lock nut is screwed into the top wall of the portion 2 on the same side of the axis 32 and has one end extending towards the arm 13. The screw 34 forms an abutment for the arm 33 in the clockwise direction.

The operation of the weighing device constituting the second embodiment is substantially identical to the one described for the first embodiment.

The zero point of the weighing device is set by putting the link 37 under a small amount of tension by appropriately adjusting the screw 33.

The weight of the receptacle causes the arm 13 to pivot clockwise about the pivot axis 32. Its end 14 then moves and, via the link 37, causes the end 31 of the bar 5 to move. This deforms the bar 5 and the deformation is detected by the strain gauge.

The screw 34 limits maximum deformation of the bar 5.

It will be observed that the side wall of the neck 51 is not held tightly by the clamp 21. The receptacle is thus essentially supported by the clamp by means of the collar 52 resting on the projections 38. Because of this disposition, the receptacle can swing under the action of centrifugal force when the platform 40 rotates without that changing the point at which the weight of the receptacle is applied to the arm 13. The processor means connected to the weight sensor can therefore apply a correction in known manner for the force that results from the centrifugal force.

Naturally the invention is not limited to the embodiment described and variant embodiments can be provided without going beyond the ambit of the invention as defined by the claims.

Although the weight sensor is shown in the form of a deformable bar that operates in bending, it could be replaced by a sensor that operates in traction or in compression.

What is claimed is:

1. A weight-filler device for weight-filling, by means of a filler spout, a receptacle having a cylindrical neck and a collar extending around the neck, the device comprising a weighing device including a holding element having a top surface forming a support for the collar of the receptacle so that the receptacle extends vertically beneath the filler spout and is cantilevered out from a support member mounted on a structure to extend laterally therefrom and associated with a weighing sensor comprising an elastically flexible bar having one end rigidly secured to the structure and an opposite end connected to said support member so that said support member extends substantially horizontally irrespective of a presence or an absence of a container on the support member.

2. A weight-filler device according to claim 1, wherein the support member is mounted to pivot about an axis relative to the structure, a portion of the support member opposite from the holding element being hinged to a free end of the deformable bar.

3. A weight-filler device according to claimed 1, wherein the deformable bar has an elongate through slot, and wherein one end of the support member opposite from the holding element is rigidly fixed to a free end of the bar.

4. A weight-filler device according to claim 1, wherein the holding element comprises a clamp having jaws including abutments disposed so that, when in contact with the abutments, the jaws define an opening of transverse dimension greater than the diameter of the neck and smaller than the diameter of the collar.

5. A weight-filler device according to claim 4, wherein the jaws have top faces that are provided with respective projecting portions.

* * * * *